US012631352B2

(12) United States Patent
Mitri

(10) Patent No.: US 12,631,352 B2
(45) Date of Patent: May 19, 2026

(54) SYSTEM AND METHOD FOR AIR FILTRATION AND THERAPEUTIC RELIEF

(71) Applicant: Jamie Mitri, Smithfield, RI (US)

(72) Inventor: Jamie Mitri, Smithfield, RI (US)

( * ) Notice: Subject to any disclaimer, the term of this patent is extended or adjusted under 35 U.S.C. 154(b) by 0 days.

(21) Appl. No.: 18/604,564

(22) Filed: Mar. 14, 2024

(65) Prior Publication Data

US 2024/0219048 A1     Jul. 4, 2024

Related U.S. Application Data

(63) Continuation-in-part of application No. 17/524,874, filed on Nov. 12, 2021.

(51) Int. Cl.
F24F 8/175 (2021.01)
A01G 22/30 (2018.01)

(52) U.S. Cl.
CPC .............. F24F 8/175 (2021.01); A01G 22/30 (2018.02)

(58) Field of Classification Search
CPC .......... A01G 9/025; A01G 22/30; F24F 8/175
See application file for complete search history.

(56) References Cited

U.S. PATENT DOCUMENTS

| | | | |
|---|---|---|---|
| 6,727,091 B2 * | 4/2004 | Darlington ............. | A01G 31/02 47/64 |
| 7,788,848 B1 | 9/2010 | Koumoudis | |
| 8,122,642 B1 * | 2/2012 | Huberman ............. | A01G 20/20 71/24 |

| | | | |
|---|---|---|---|
| 8,141,294 B2 | 3/2012 | Bribach et al. | |
| 8,181,391 B1 * | 5/2012 | Giacomantonio ..... | A01G 31/02 47/62 A |
| 8,707,619 B2 | 4/2014 | Edwards et al. | |
| 9,226,457 B2 | 1/2016 | Laurence et al. | |
| 9,462,755 B1 * | 10/2016 | Coraggio ............... | A01G 9/025 |
| 10,258,918 B2 | 4/2019 | Maekipaeae et al. | |
| 2008/0072488 A1 * | 3/2008 | Fujita ..................... | A01G 20/20 428/323 |
| 2008/0110086 A1 * | 5/2008 | Julia ...................... | A01G 9/025 47/64 |
| 2013/0118070 A1 | 5/2013 | Marquez | |
| 2013/0160363 A1 * | 6/2013 | Whitney ................ | A01G 9/025 47/59 S |

(Continued)

FOREIGN PATENT DOCUMENTS

| | | |
|---|---|---|
| JP | 2004305007 A | 11/2004 |
| KR | 100858993 B1 | 9/2008 |

(Continued)

OTHER PUBLICATIONS

Translation of KR 20150002601 U (Year: 2015).*

(Continued)

*Primary Examiner* — Timothy D Collins
*Assistant Examiner* — Brittany A Lowery
(74) *Attorney, Agent, or Firm* — Law Office of Ilya Libenzon

(57) ABSTRACT

A system and related method for air filtration and therapeutic relief are provided. The system includes a base layer, a substrate and a plant medium layer, which can be live, preserved or dormant moss. In some instances, the system also includes one or more netting layers. The system can also include a watering system, or air circulation system, or both.

3 Claims, 25 Drawing Sheets

80

(56)                References Cited

U.S. PATENT DOCUMENTS

| | | | | |
|---|---|---|---|---|
| 2014/0196365 A1* | 7/2014 | Washington | ........... | A01G 9/124 |
| | | | | 47/65.5 |
| 2015/0289452 A1* | 10/2015 | Axley | ........................ | F28C 3/06 |
| | | | | 47/65.5 |
| 2015/0313094 A1* | 11/2015 | Stojakovic | ............. | A01G 27/00 |
| | | | | 29/428 |
| 2015/0334926 A1 | 11/2015 | Corbani et al. | | |
| 2020/0163286 A1* | 5/2020 | Wilde | .................... | G05B 15/02 |
| 2020/0236880 A1 | 7/2020 | Wells | | |
| 2020/0323154 A1 | 10/2020 | Benner et al. | | |
| 2021/0059139 A1* | 3/2021 | Jang | ........................ | A01G 31/02 |

FOREIGN PATENT DOCUMENTS

| | | | |
|---|---|---|---|
| KR | 100934787 B1 | | 12/2009 |
| KR | 101304784 B1 | * | 9/2013 |
| KR | 101671910 B1 | | 11/2016 |
| WO | 2019157598 A1 | | 8/2019 |

OTHER PUBLICATIONS

Esty product; Chevron Moss Wall; Barragan Design CO; https://www.etsy.com/listing/530655825/chevron-moss-wall?click_key=5281bd92f58343e969fa23ac26c4ea9c2e01c395%3A530655825&click_sum=e535d6dd&ref=shop_home_recs_1&frs=1 (Year: 2017).*

Translation of DE_102019206766_A1 (Year: 2020).*

Translation of KR_100858993_B1 (Year: 2008).*

Translation of KR101074931B1 (Year: 2011).*

Translation of WO9952358A1 (Year: 1999).*

Translation of KR_102292339_B1 (Year: 2021).*

PCT/US21/61322, International Search Report and the Written Opinion of the International Searching Authority, Mar. 28, 2022.

Maria Kmiec, Green Wall Technology, Technical Transactions Architecture, 10-A/2014.

Katia Perini et al. Experiencing Innovative Biomaterials for Buildings: Potentialities of Mosses, Building and Environment 172 (2020) 106708.

* cited by examiner

<u>1</u>

2

3

4

20

50

<u>60</u>

70

16

16

16

80

SYSTEM AND METHOD FOR AIR FILTRATION AND THERAPEUTIC RELIEF

FIELD OF THE INVENTION

This invention relates generally to air filtration and therapeutic relief systems incorporating moss.

BACKGROUND OF THE INVENTION

Contaminants in the air such as CO2, Volatile Organic Compounds, dust particulates such as particulate matter (PM2.5 and PM10), allergens, metals, bacteria, viruses, sulfur oxides, nitrogen oxides, and other chemicals can cause both environmental and health impacts that are generated from such indoor emissions as cooking, pet dander, tobacco smoke, burning candles or oil lamps, fireplaces, cleaning, and outdoor emissions such as power plants, construction sites, automobiles, manufacturing and industry emissions, and burning of fossil fuels such as fires. Diseases such as respiratory illnesses such as allergies and asthma, heart disease, cancer, and death are caused by particulate matter (both PM2.5 and PM10), allergens, dust, and other chemicals in the air.

The import of nature and greenery into an indoor or outdoor environment, known as biophilic design, is known to be therapeutic and relieve stress and anxiety. However, biophilic design is not optimal and effective in many aspects. For example, biophilic design focuses only on the sense of sight and doesn't take other senses into consideration while providing stress and anxiety relief.

Therefore, there is a need for a therapeutic stress and anxiety relief device that goes above and beyond biophilic design by not only engaging vision, but engaging the senses of sight, smell, hearing and touch to reduce stress anxiety. This system is an aesthetically pleasing air filtration system designed and configured to treat and filter particulate matter and other harmful chemicals that impact the environment and human health, and which can be used in both indoor and outdoor settings, along walls or the side of buildings.

SUMMARY OF THE INVENTION

A system and related method for air filtration and therapeutic relief are provided. The system includes a base layer, a substrate and a plant medium layer, which can be live, preserved or dormant moss, or combination thereof. In some instances, the system also includes one or more netting layers. The system can also include a watering system, or air circulation system, or both.

In some instances, a filtration layer can be included using one or more combination of commercial filters. The commercial filters may work in conjunction with the moss, creating a multi-layered filter targeting different compounds, or may be separate of the moss layer.

In some instances, a netting layer can be wrapped around a plant medium layer disposed on the substrate. In some instances, the system can have a modular design including a plurality of detachable panels. In some instances, the panels can be attached to each other permanently.

According to some embodiments of the present invention, the base can further include one or more LED lights disposed on the perimeter of the base along sidewalls of the base, or on the backside of the base, or on the front side of the base. The plurality of LED lights can form an array of LED light disposed on a strip, which can be attached to the base using any suitable attaching means such as Velcro, adhesive, glue, or the like.

BRIEF DESCRIPTION OF THE DRAWINGS

The preceding summary, as well as the following detailed description of the disclosed system and method, will be better understood when read in conjunction with the attached drawings. It should be understood, however, that neither the system nor the method is limited to the precise arrangements and instrumentalities shown.

DETAILED DESCRIPTION OF SPECIFIC EMBODIMENTS

An air filtration system in accordance with the present invention incorporating moss in a modern and visually pleasing design to treat and filter particulate matter (PM2.5 and PM10), CO2, volatile organic compounds, bacteria, and viruses, as well as other harmful chemicals that impact the environment and human health is provided. The system can be used in both indoor and outdoor settings, and along walls or the side of buildings.

A certain species of moss must be first selected. According to a method of the present invention, moss species that grow in sheets or mats, which are known as Pleurocarpous moss, or mosses that grow in clumps, such as Acrocarpous moss can be used. Pleurocarpous moss examples include mosses in the Genus Hypnum, and Thuidium, while an Acrocarpous moss example includes the Genus Leucobryum and Dicranum. These mosses are preferably selected as they are slower growing than most mosses and do not require as much water as most mosses. Other species of mosses can be also used in this invention and contain a combination of different species of moss. The moss can be live, preserved, or dormant, or combination thereof (such as a combination of live and preserved moss, for example, or a combination of live and dormant moss, etc.). The moss can be preserved in glycerin and water, for example.

Mosses are sustainable under certain environmental conditions such as sunlight, humidity (60% to 80%), moisture, pH (5-6) and temperature (60 degrees Fahrenheit to 80 degrees Fahrenheit). Selecting the engineering design of the invention to keep each environmental condition needed for each moss type within ranges is crucial to sustaining the moss. Since mosses are nonvascular and do not contain roots, they need a substrate in which to receive nutrients and water to keep within the needed environmental conditions. A strong physical connection or bond between the moss and substrate is also needed for the moss to be sustainable in its environment. According to the embodiments of the present invention, different species of moss can have a combination of varied substrate material needs, such as a flat, water absorbing and retentive substrate, or a combination of composites or acidic substances to ensure the pH range in its environment.

Figure 1:
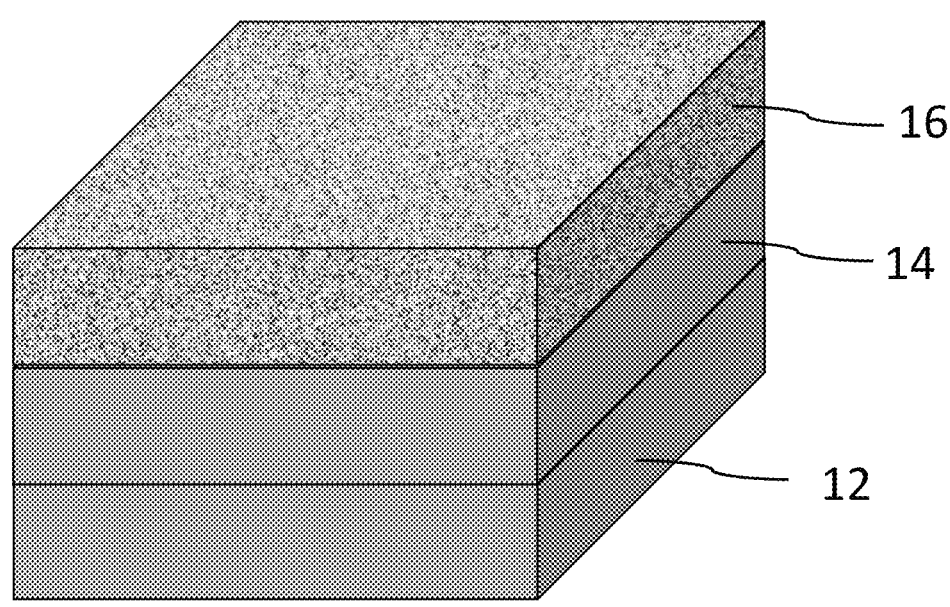
FIG. 1 is a schematic diagram showing an air filtration system in accordance with the present invention.

As shown in FIG. 1, the air filtration system 1 of the present invention includes a base layer 12, a substrate layer 14 and a plant layer 16, which can be live, preserved, or dormant moss, or combination thereof. The substrate shall be used that is a water absorbing or retentive material to keep moisture content within the needed range, such as felt, wool, fabric, soil, cloth, rock, stone, wood, or a sponge. A strong physical connection or bond between the substrate and moss is needed for the moss to be sustainable. The substrate and moss are connected directly to a wall or to a base material. According to some embodiments of the present invention, the base material can also be the substrate. Thus, the air filtration system can include a substrate and a plant layer and no base layer.

Figure 8:
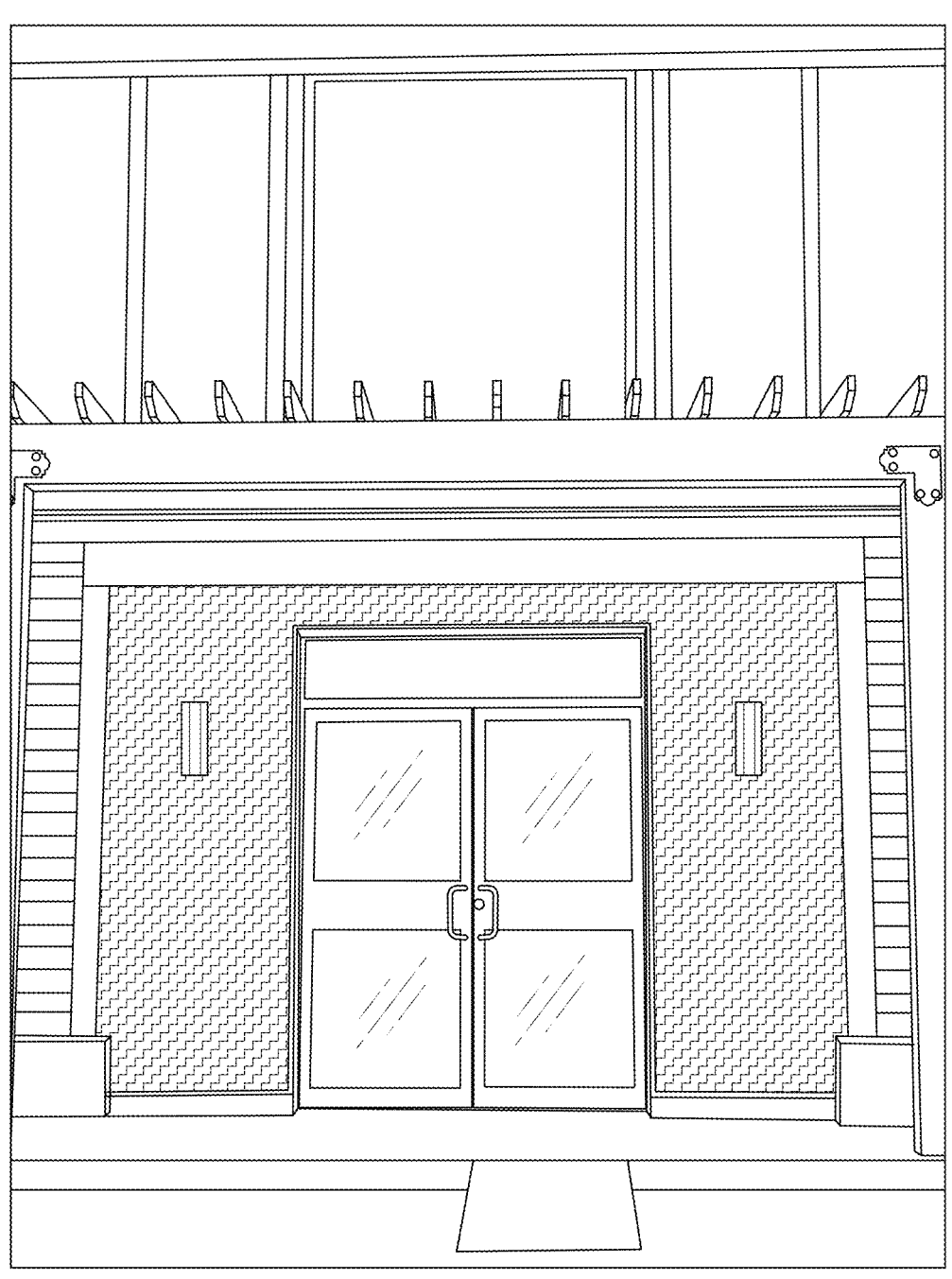
FIG. 8 and FIG. 9 show the system of the present invention mounted into the front wall/facade of a building in the outdoor setting.
Figure 9:
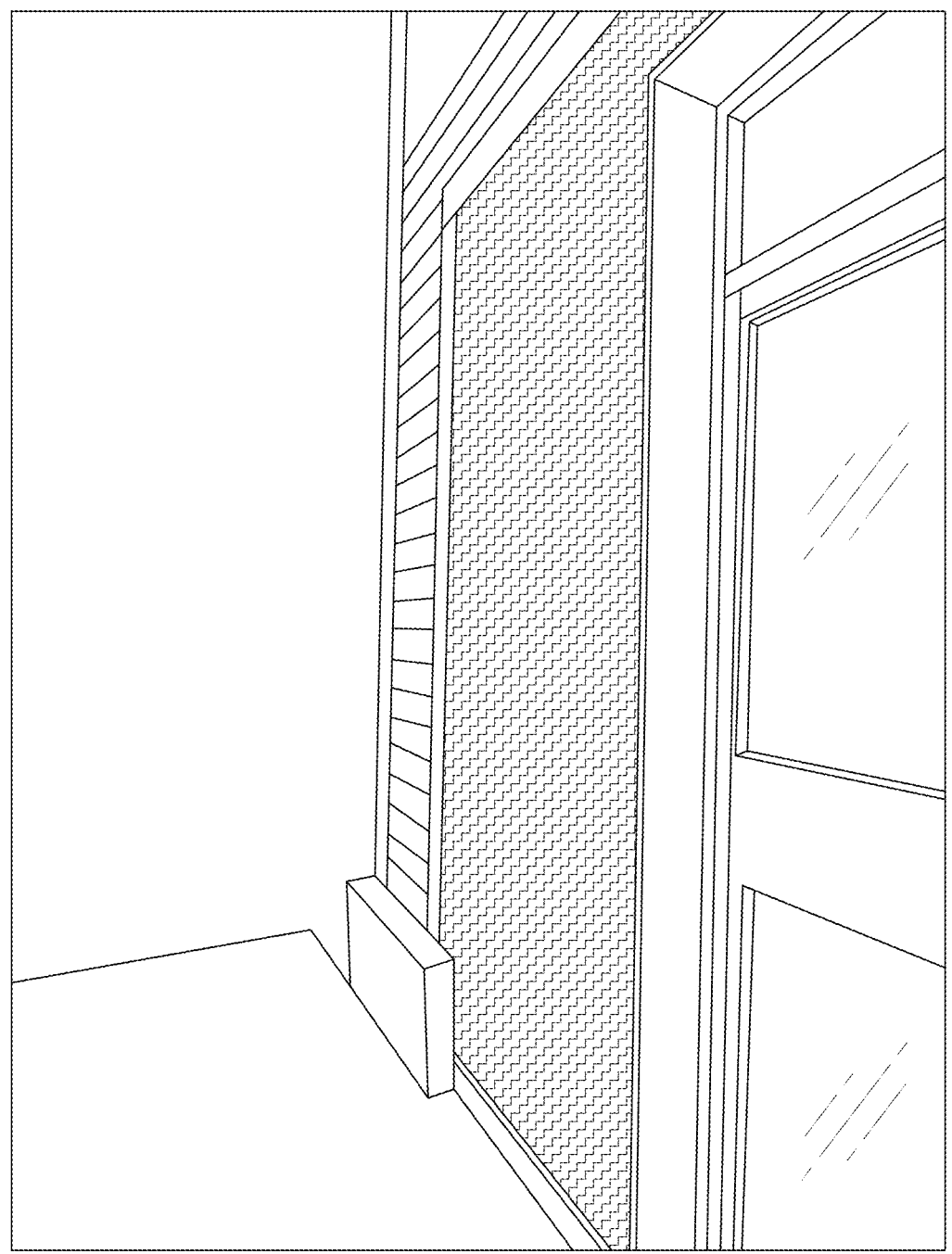
Figure 10A:
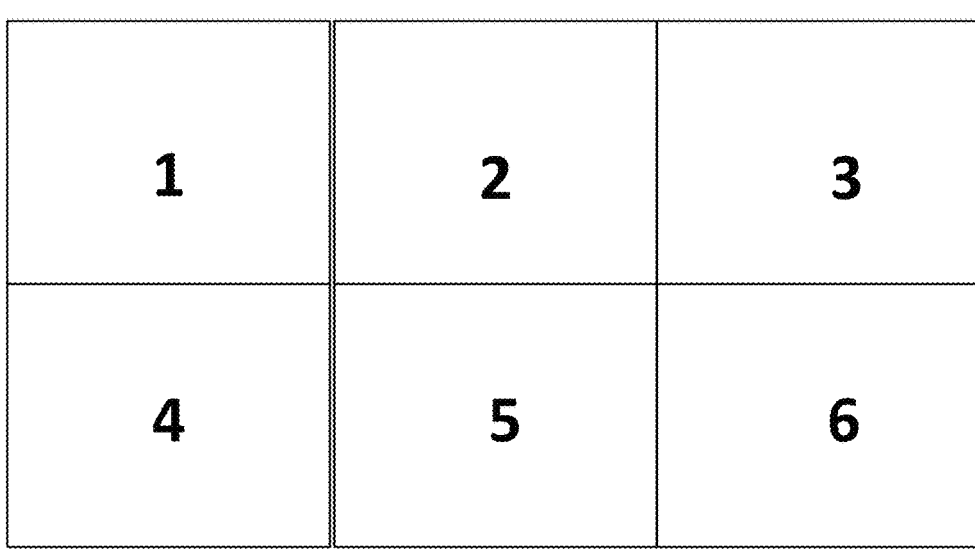
FIG. 10A is a schematic illustration of the system having a square modular design.
Figure 10B:
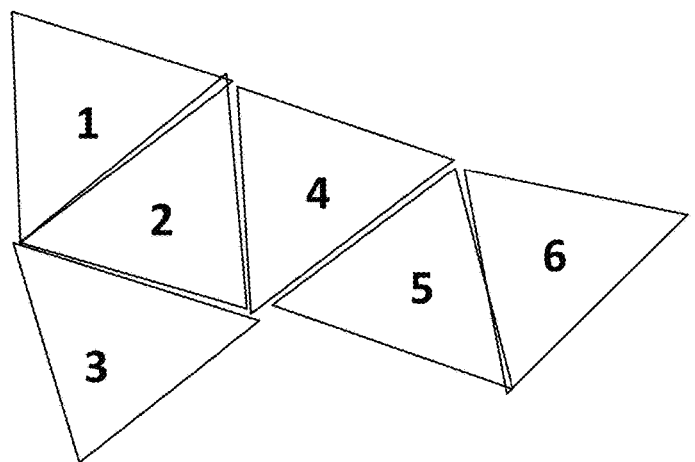
FIG. 10B is a schematic illustration of the system having a triangle modular design.

The base can be made of water resistant material and/or anti-corrosive material such as plastics, PVC, metal, or composite aluminum, metal alloys, galvanized steel, or stainless steel. Or it can be made of a non-water resistant material, such as wood and painted with a water resistant paint or adding a layer of water resistant material such as a sheet or film. The base material can be of varying sizes and depths (such as a rectangular, square, or circular recessed unit as shown in FIGS. 5A-5B and 6-9, for example), a frame tray, or combination of, that can be used as a decorative unit and held up either vertically or horizontally on such furniture as desks and tables. The base can also be a sheet, frame, panel, or a modular panels that can be attached and connected to fill an entire wall both as a standalone unit as shown in FIG. 8, or as interlocking units that connect along a wall or building as illustrated in FIGS. 10A-10B. In some instances, the system can have a modular design including a plurality of detachable panels. In some instances, the panels can be attached to each other permanently.

The base can be combination of water resistant and non-water resistant material. Recycled material such as reclaimed wood or recycled plastic can be used as the base material. The base material can also be a combination of materials such as a wood-poly composite. The unit can be open or closed off in the front with a material such as plastic, glass, or plexiglass, and an open space at the top of the unit for ventilation. The unit may have perforations within or outside the base for optimized air flow.

The substrate can include antifungal materials which can also be added to the design to increase the substrate and moss bond, air filtration properties, and protect the moss from mold, fungus, and other organisms. Antifungal components may be natural ingredients such as essential oils, garlic, coconut oil, aloe vera, apple cider vinegar or a combination to ensure substrate properties are within environmental conditions of the moss. In some instances, antifungal foam sheets or panels can also be used for the purpose.

Figure 2:
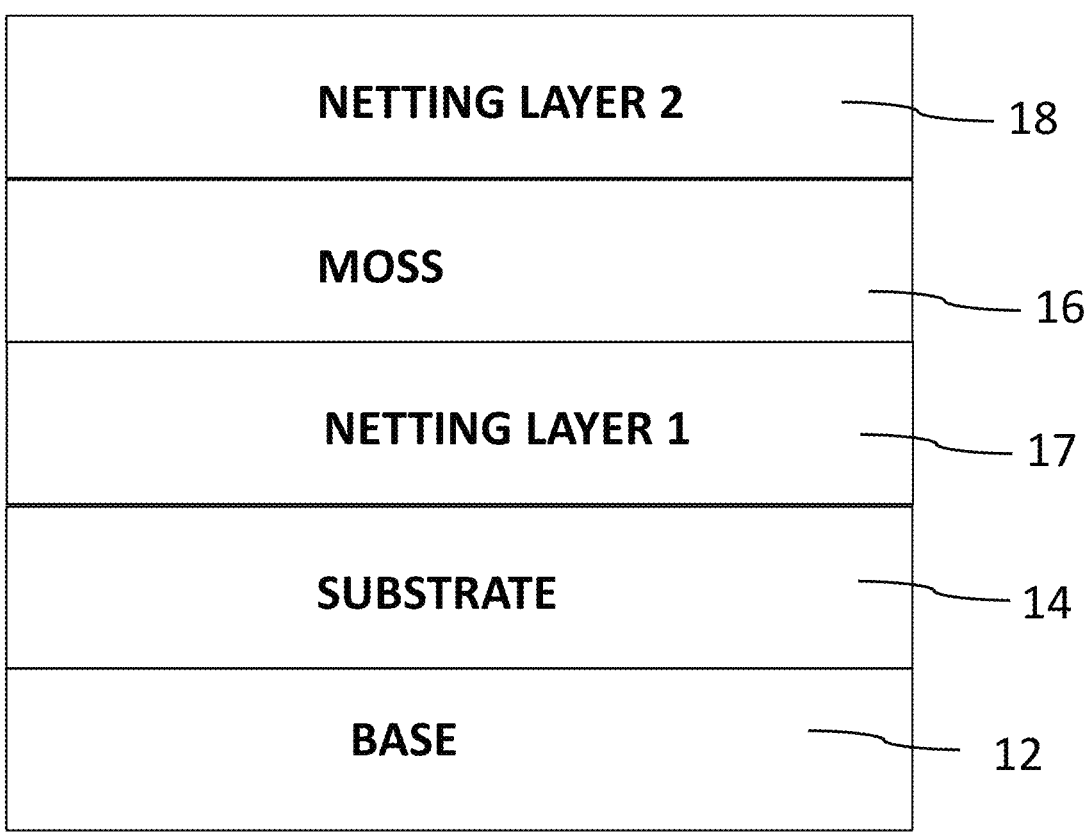
FIG. 2 is a schematic diagram showing a system with netting layers in accordance with an embodiment of the present invention.

According to some embodiments of the present invention, the air filtration system 2 can also include one or more netting layers. As illustrated in FIG. 2, the system 2 can include a base 12, a substrate 14, a first netting layer 17, plant medium 16 such as moss, and, optionally a second netting layer 18.

Figure 3:
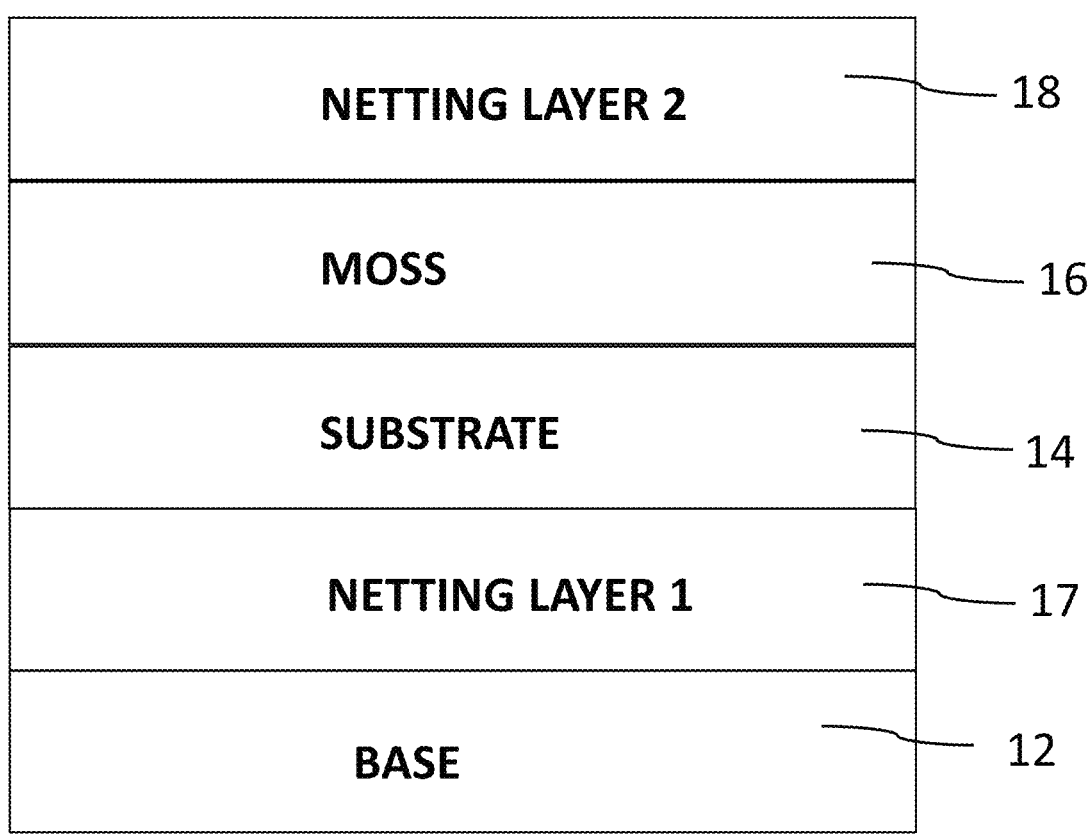
FIG. 3 is a schematic diagram illustrating a system with netting layers in accordance with another embodiment of the present disclosure.

In some instances, as shown in FIG. 3, the system 3 can include a base layer 12, a first netting layer 17, a substrate 14, a plant medium 16 such as moss, and optionally a second netting layer 18. This combination can be created by first laying down an initial layer of the netting, next laying down the substrate on top of the netting, applying the moss to the substrate, and applying a second layer of netting. This moss, substrate, and netting combination can then be attached as is to the base, securing the combination into place.

Materials such as bird netting, a poly and wood composite, trellis, metal or wire can be used to keep the moss in place, and further the connection between the moss and substrate. It will be appreciated by a person skilled in the art that other materials that will enhance the physical bond between the substrate and moss can also be used.

Figure 4:
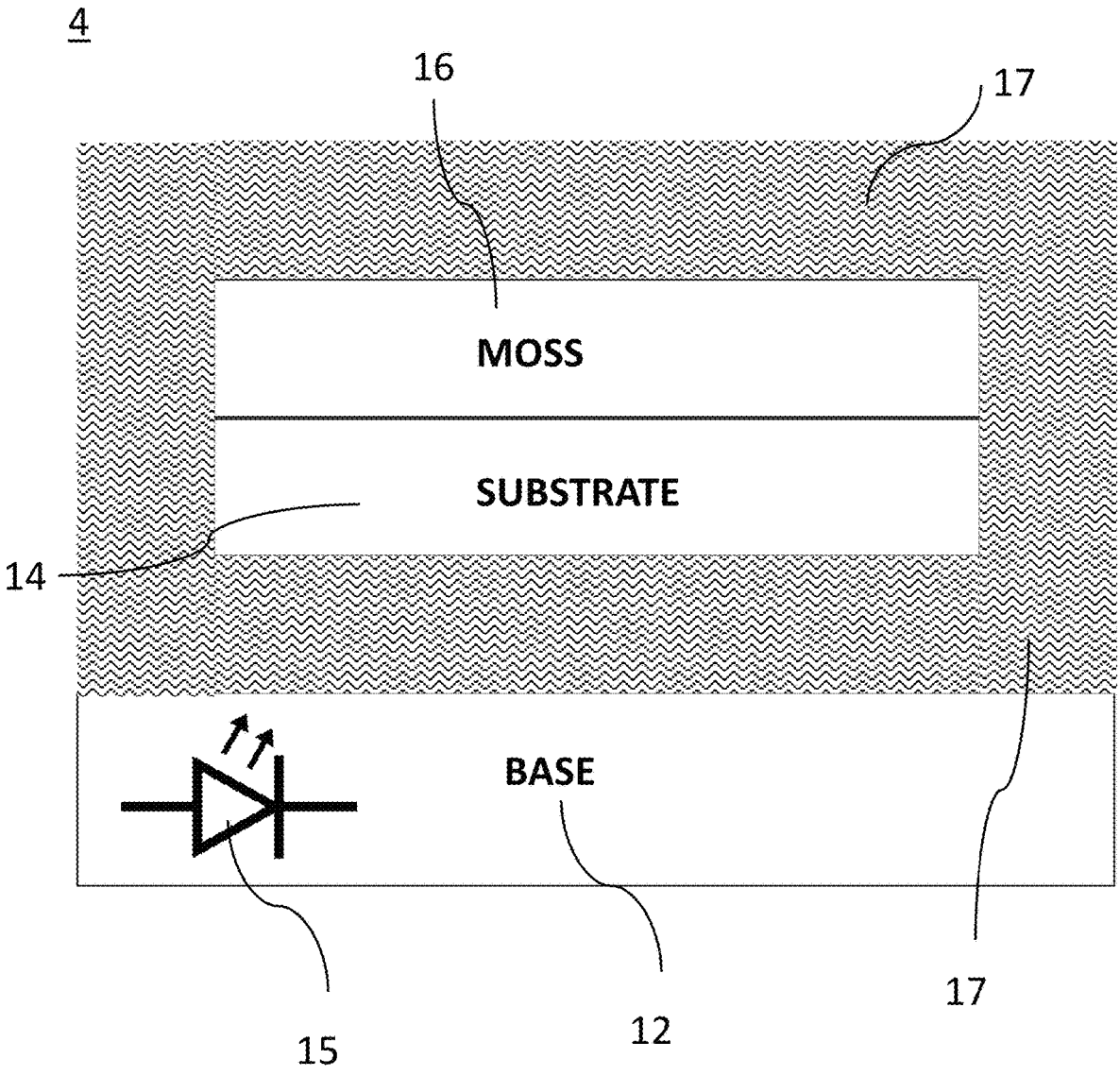
FIG. 4 is a schematic diagram showing a system with a single netting layer in accordance with the present invention.
Figure 5A:
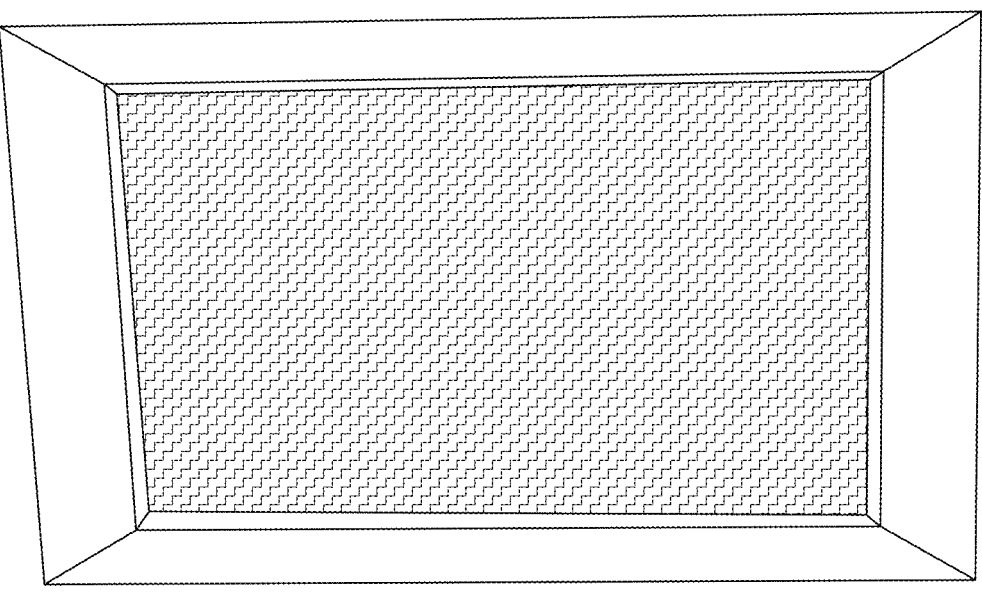
FIG. 5A is an illustration of the system incorporating a rectangular recessed base.
Figure 5B:
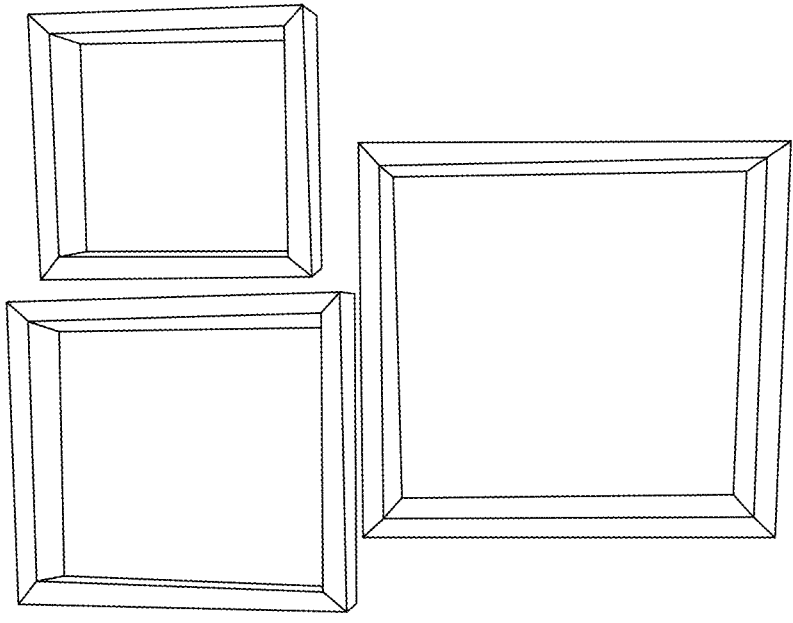
FIG. 5B is an illustration of the rectangular recessed base of the system shown in FIG. 5A.
Figure 6:
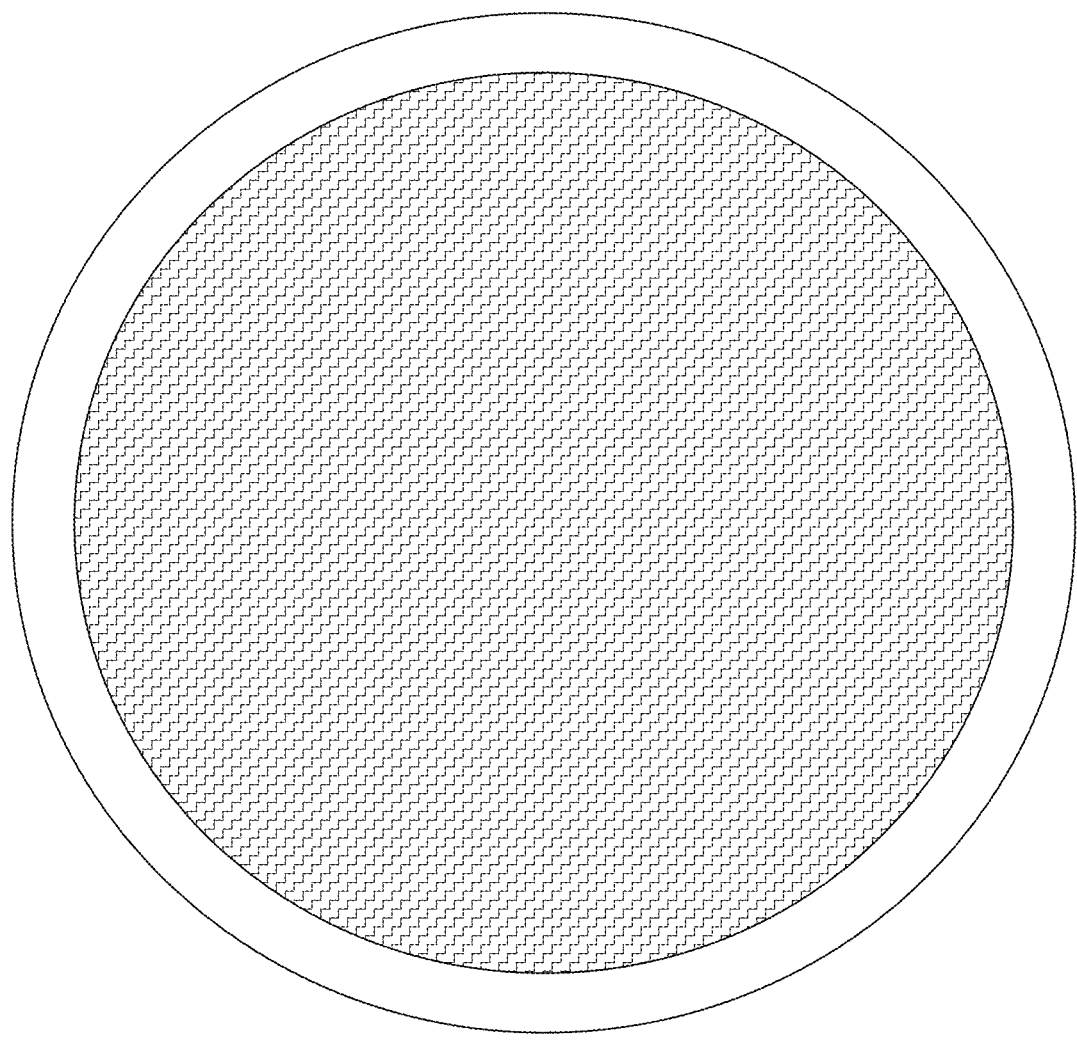
FIG. 6 is an illustration of the system incorporating a circular base.
Figure 7:
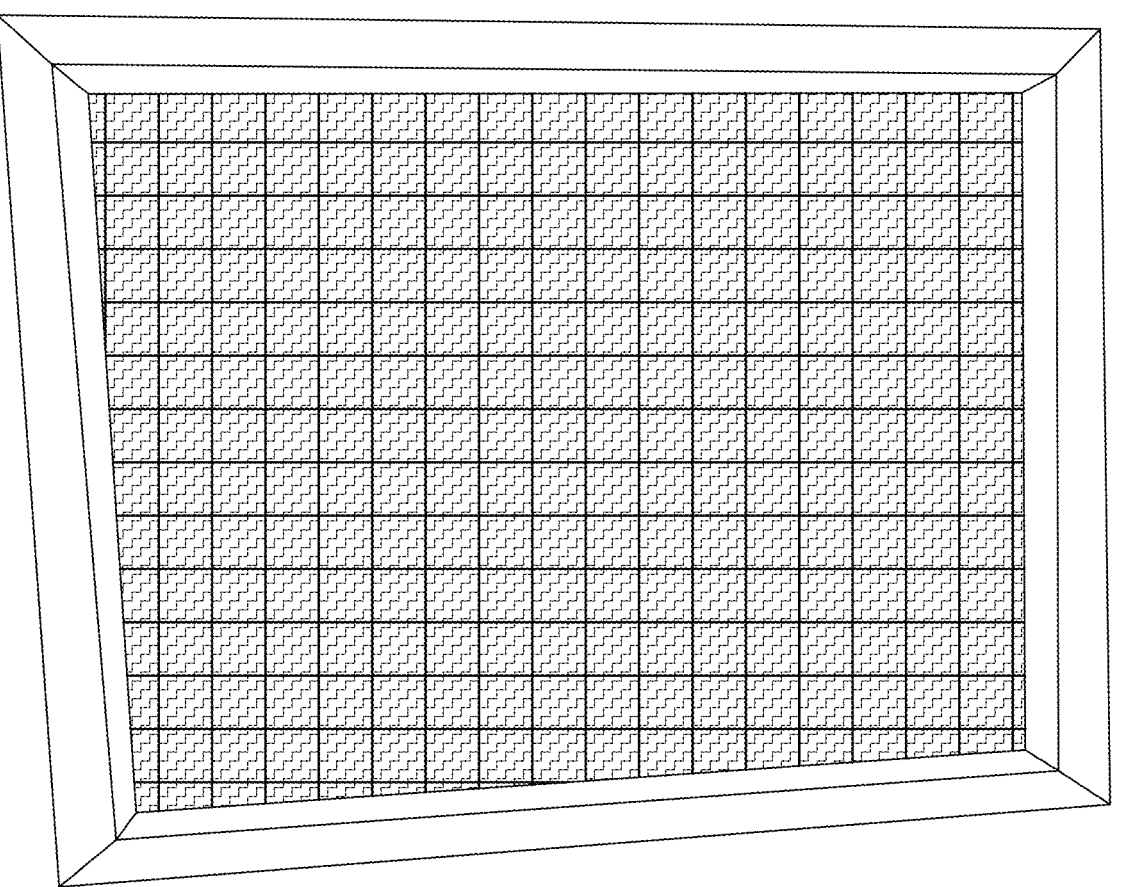
FIG. 7 shows a system having a rectangular base and netting.

According to some embodiments of the present invention, as illustrated in FIG. 4, the system 4 can include a base layer 12, a first netting layer 17 wrapped around a substrate layer 14 and plant medium layer 16 such as moss. This combination can be created by first laying down a first extended netting layer, next laying down the substrate on top the first extended netting layer, applying the moss to the substrate, and wrapping the extended initial netting layer around the substrate/moss layer. This moss/substrate/netting combination can then be attached as is to the base, securing the combination into place.

In accordance with the methods of the present invention, the method making an air filtration system can include the following steps. Step 1: Place down a layer of the netting. Keep more than the needed amount or keep the entire roll intact so that it can be wrapped around the other layers to seal the entire combination. Step 2: Place the substrate on top of the netting. Step 3: Place the moss on top of the substrate and netting. Step 4: Either a second layer of netting can be applied or the initial, extended netting can be wrapped around the substrate and moss and on top of the initial layer of netting as illustrated in FIG. 4. The newly formed netting, substrate, moss layer can be sealed by affixing the outer edges of the two netting layers and attaching this unit to the base material, or by directly attaching the entire unit as is to the base material. In some other instances, the method includes the step of first applying the substrate to the base. The moss is then applied to the substrate. The netting is then attached to the substrate or base, securing the layered combination into place.

In some instances, the moss can also be affixed to the substrate or base using an adhesive without the use of netting. Organic based adhesives, cyanoacrylate gels, plastic glues, and silicone-based adhesives can be used.

Figure 11:
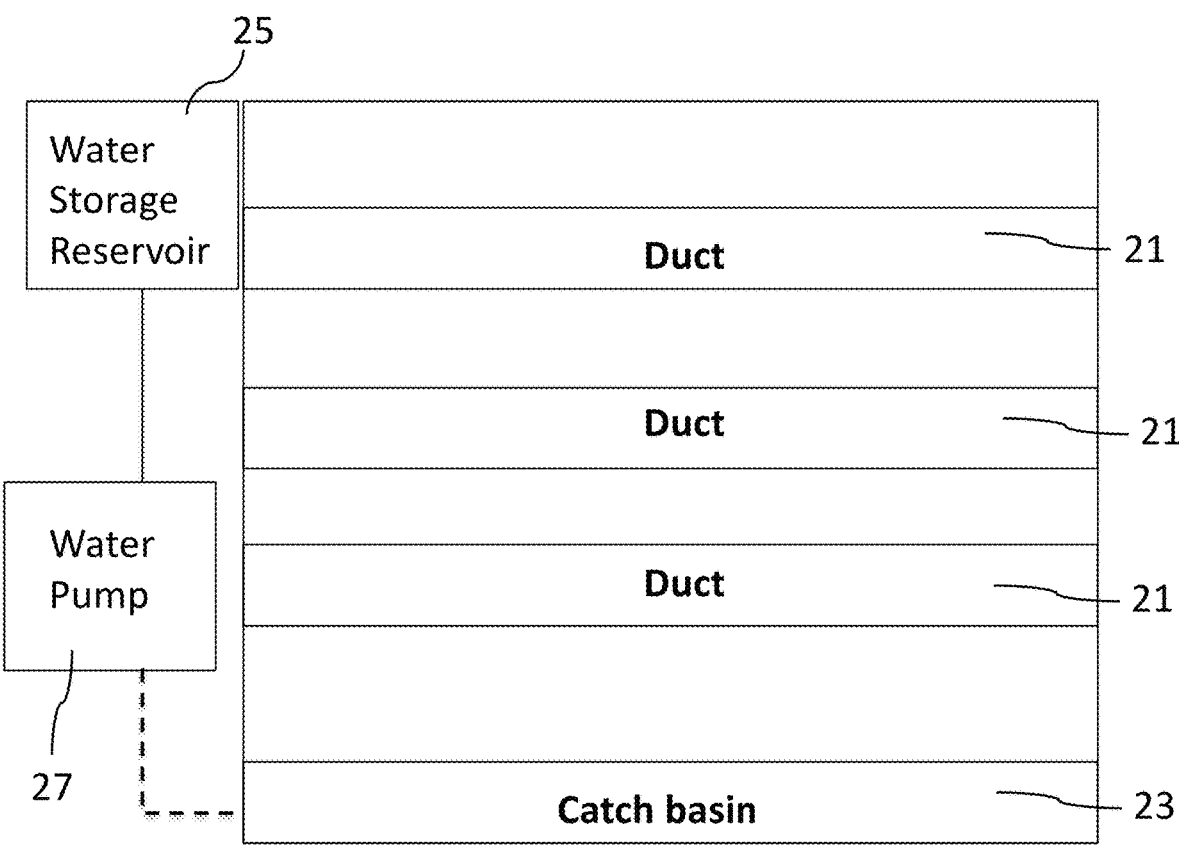
FIG. 11 is a schematic diagram showing the system of the present invention incorporating a watering system.
Figure 12:
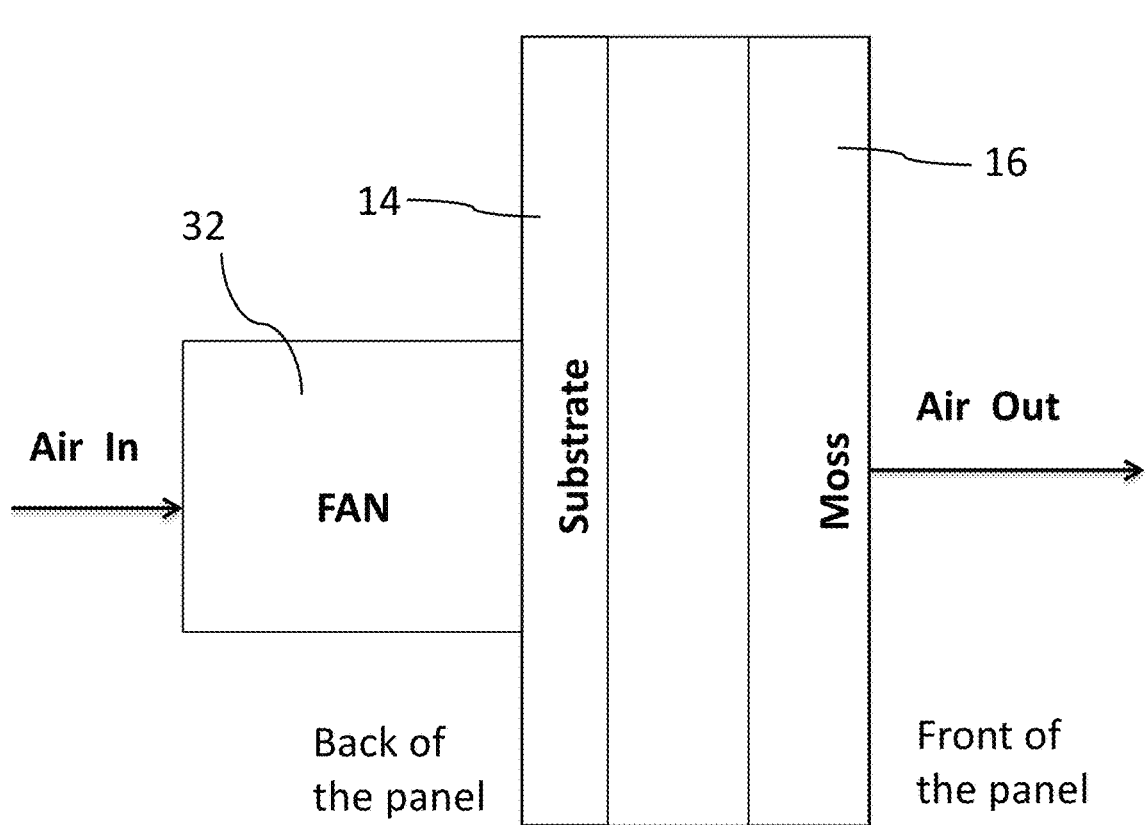
FIG. 12 and FIG. 13 is a schematic diagram showing the system of the present invention incorporating an air circulation system.

The live moss may or may not require watering as the substrate layer is designed to contain water for the moss. If the moss does require watering, it can be done manually or by employing a watering system. The air filtration system of the present invention can also include a watering system 20 as illustrated in FIG. 11, for example. The system can contain a water reservoir 25, which is connected to a duct system 21. Water can be gravity fed from the top of the unit to the bottom of the unit, through each duct-tubing layer 21. A drip irrigation technique of installing tubing as the duct system and installing additional misters or sprinklers to provide water to the unit while ensuring water conservation. The watering frequency can be done either manually or automatically using a timer or sensor, which would also ensure water conservation. A catch basin 23 can be installed at the bottom of the unit to collect excess water. In salt water habitats, spring water, distilled water, or recycled water such as storm water (runoff or snowmelt) or condensation from HVAC units can be collected and used to water the system, as moss does not thrive well in salt water environments. In some instances, the system can also include a water pump 27 connected to the water storage reservoir 25, and optionally to the catch basin 23.

Figure 13:
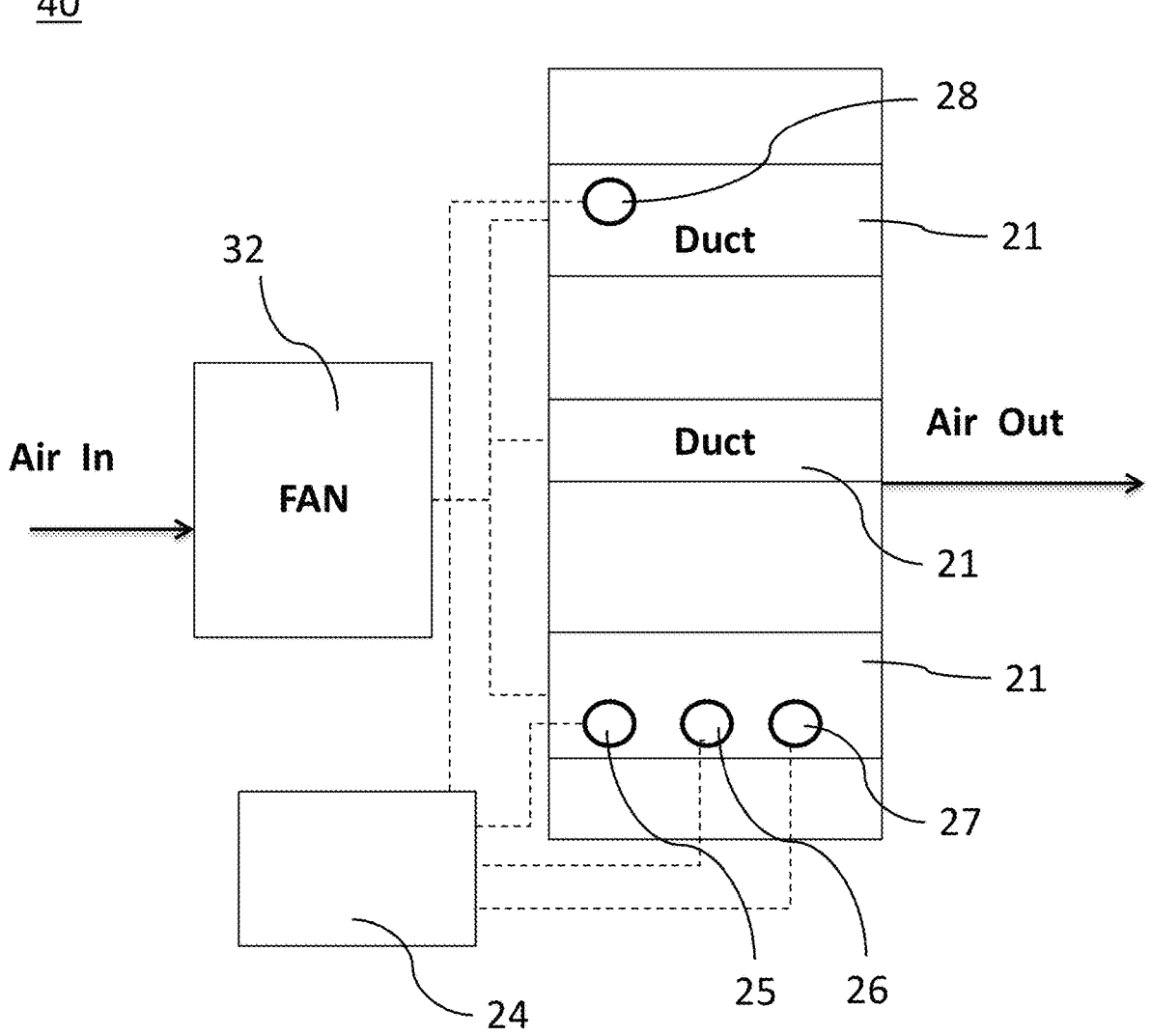
Figure 14:
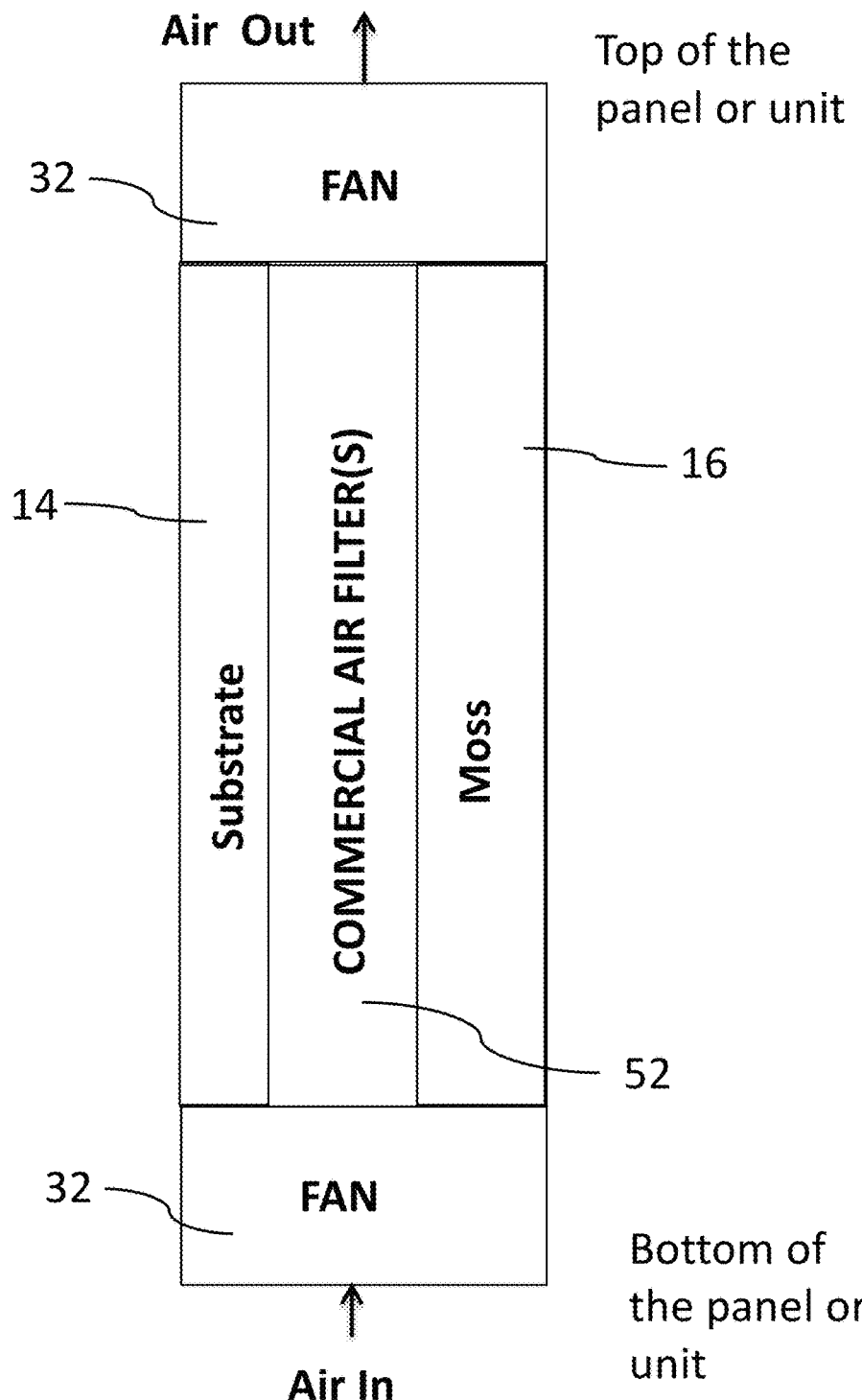
FIG. 14 is a schematic diagram showing the system of the present invention incorporating an air circulation system with commercial air filter(s).

Referring to FIG. 13, if the system is automated, it can have pressure-compensating emitters 28, to maintain constant pressure throughout the duct system. The timer and emitters can be connected to a main controller 24, which may be controlled by a mobile app. Flow sensors 25 may be installed and connected to the main controller 24 to conserve water usage and ensure the moss and plants are getting the adequate amount of water. The main controller 24 can be installed to control and measure water temperature, water flow, water pressure, air pressure, air flow, and other factors. $CO_2$ sensor 26, humidity, and $O_2$ sensor 27 may also be installed throughout the unit. The controller 24 may be connected and powered using a mobile app.

The air filtration system of the present invention can also include an air circulation system 30 as illustrated in FIGS. 12-15. To increase the rate of filtration of harmful pollutants, and to keep humidity levels within range, a fan 32 can be installed and provide a current through ducts 21 to the unit so that the polluted air flows through the moss as the media, and clean air is discharged from the unit. The air filtration rate of the moss can be increased by increasing the airflow rate of the air throughout the unit. The greater the airflow velocity, the higher the filtration rate.

Figure 15:
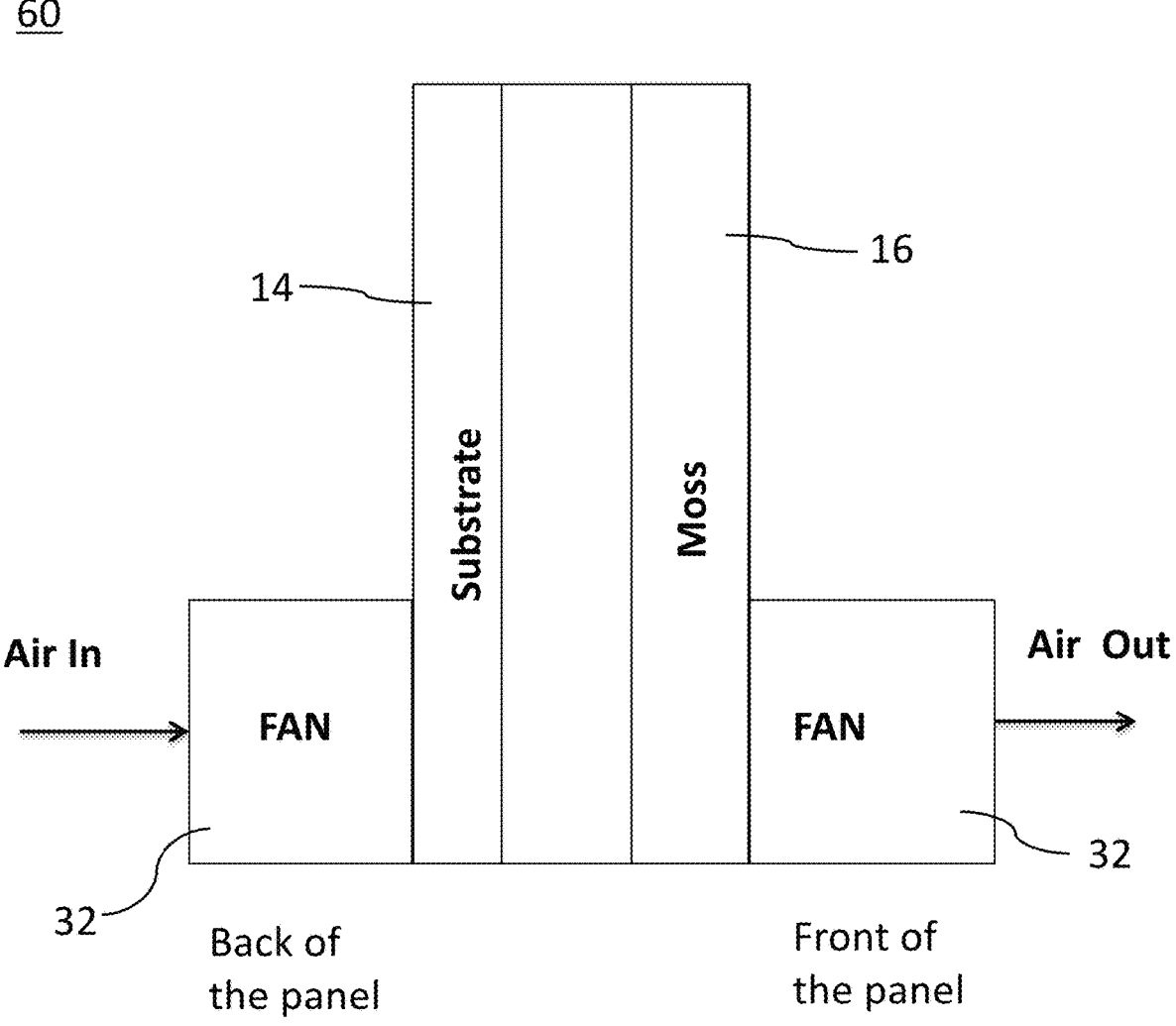
FIG. 15 is a schematic diagram showing the system of the present invention incorporating an air circulation system having a dual fan configuration.

The air filtration system can either be passive, using only one fan, or active, utilizing more than one fan. In the simplest case of more than one fan being installed, there will be an inlet fan, allowing air through the system, and another fan at the outlet, helping to discharge air. If needed, more than one fan can be installed throughout the unit to allow air to flow through the plant medium, as illustrated in FIG. 15, for example. The efficiency of the fan(s) can be increased, and friction decreased by decreasing the length of the ducts and by increasing the diameter of the ducts. This also prevents clogging of the duct line and subsequently, overheating of the fan(s). The polluted air flows through the moss as the media, and clean air is discharged from the unit. Although the greater the airflow velocity, the higher the filtration rate, it is important to not directly surge the moss with an air current as it may cause damage to the moss and its leaves. In order to decrease strain on the fan, a timer may be installed so that the fan is not on at all times.

The air filtration system can include the watering system as described above and illustrated in FIG. 11 or the air filtration system as described above and illustrated in FIGS. 12-15, or a combination of both systems. In some instances, the air filtration system can also include a lighting system comprising one or more LED lights 15 as described above and illustrated in FIG. 4. According to another embodiment of the present invention, the air filtration system can include a UV light source disposed in the base or frame of the system and configured to kill bacteria.

The design aspect of the invention elevates sensory input in innovative approaches and therefore reduces stress and anxiety and improves productivity. By including moss with the combination of 3-D designs, natural materials such as wood, and activation of sensory input such as sight, touch, and smell from the invention elude being in nature and also aid in therapeutic relief. For example, spray bottles, ergonomically selected and or designed for every hand type, is provided with the invention, spray misting the moss is calming and emits an evergreen smell like fresh grass all inside an outdoor environment. The invention can also include speakers or music, which is not just calming for people but for the moss as well, as moss is known to absorb sounds. In some instances, the speakers can be built into a frame, or can be part of the system as a stand-alone module.

Figure 20:
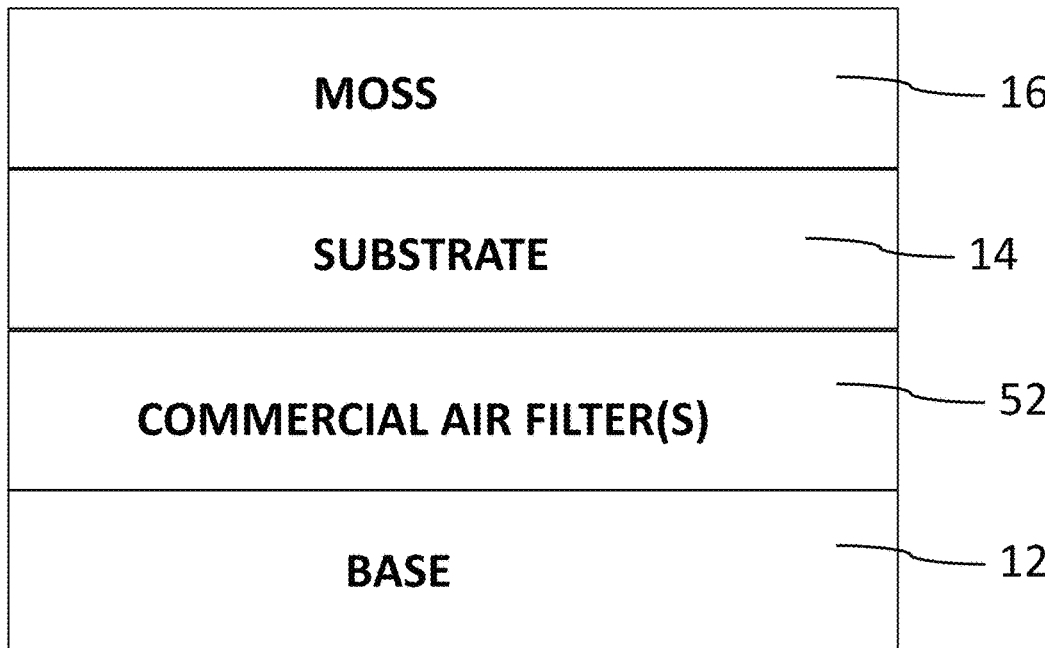
FIG. 20 is a schematic diagram showing a system incorporating commercial air filter(s) in accordance with an embodiment of the present invention.
Figure 21:
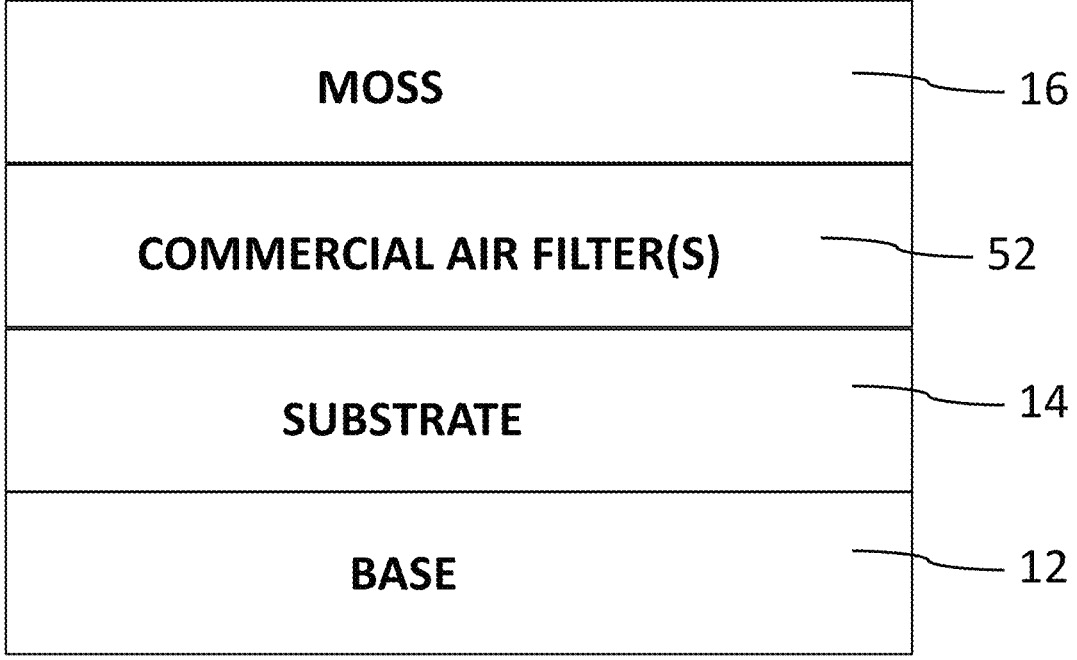
FIG. 21 is a schematic diagram showing a system incorporating commercial air filter(s) in accordance with another embodiment of the present invention.

Moss is a sufficient air filter on its own. However, one or more layers of commercial air filters 52 of different materials and targeted compounds may be used in synergy with the moss to optimize air purification, as schematically illustrated in FIGS. 20-21. They can either be separated from the moss 16 or attached as part of the moss and or substrate layer 14. The different layers can be stacked in an interlocking chamber, where they can be removed and installed easily. One or more filters 52 may be biodegradable to avoid waste. The filters may be commercially available filtration media of different materials, pore sizes to target specific compounds. The filters 52 can comprise a multi-layered structure having different filter media in a sequence. In some instances, the filter 52 can be a carbon filter configured to filter volatile organic compounds (VOCs) such as benzene and the like. In some other instances, it can be a bacterial filter characterized by a certain merv rating and configured to filter bacteria and viruses. Each type of filter or both can be used in combination with the moss filter thereby creating a synergetic effect.

A medium downstream of the moss and filter may be used to capture particles and compounds captured by the moss and filter layers. Air will be introduced in an inlet and outlet fashion, going through the different layers of filters, including the moss.

The housing of the filter or base unit may be made of metal, glass, plastic, composite aluminum, metal alloys, galvanized steel, or stainless steel, or any other suitable materials, but the metal preferably should not make direct contact with the moss as it can deplete the watering source for moss and cause harm to the plant medium such as live or dormant moss. In some instances, the metal present in the substrate could also cause harm to the plant medium even when the moss is not in direct contact with the substrate, thus the substrate should be substantially devoid of metal, according to another preferred embodiment of the present invention.

Figure 16:
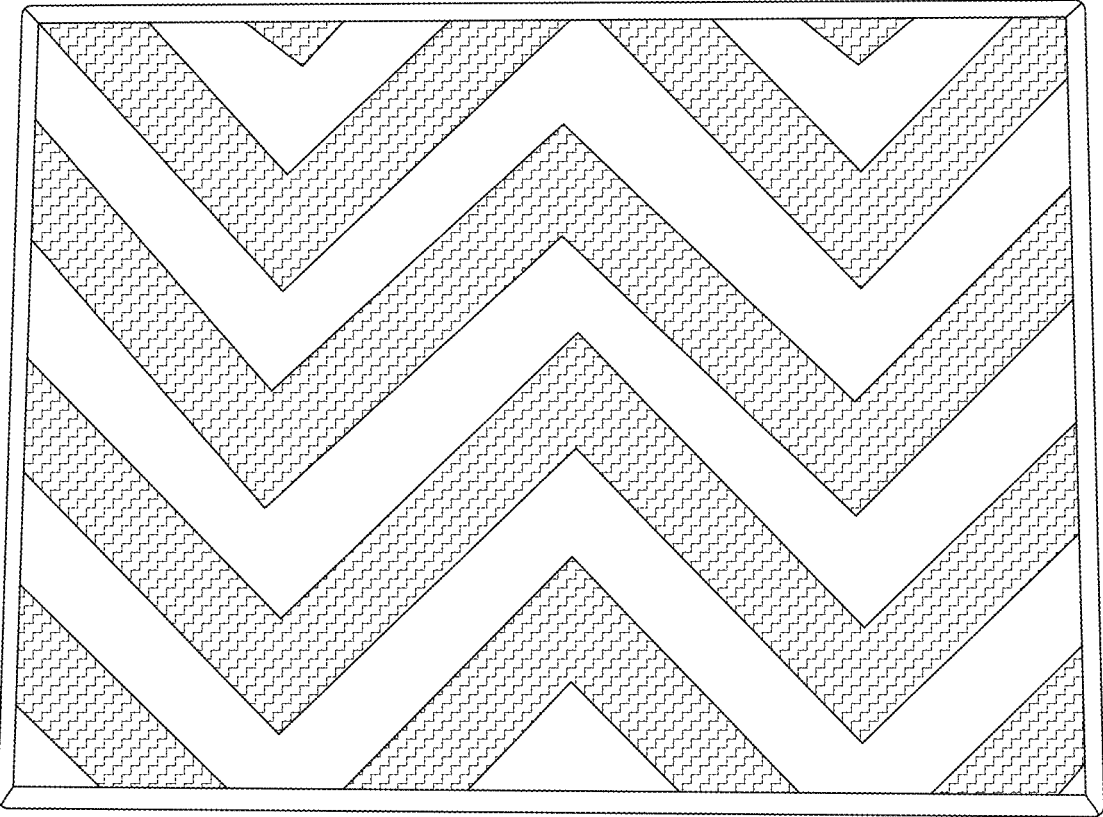
FIG. 16 is an illustration of the system of the present invention having a filtration medium arranged in a zig-zag configuration.
Figure 17:
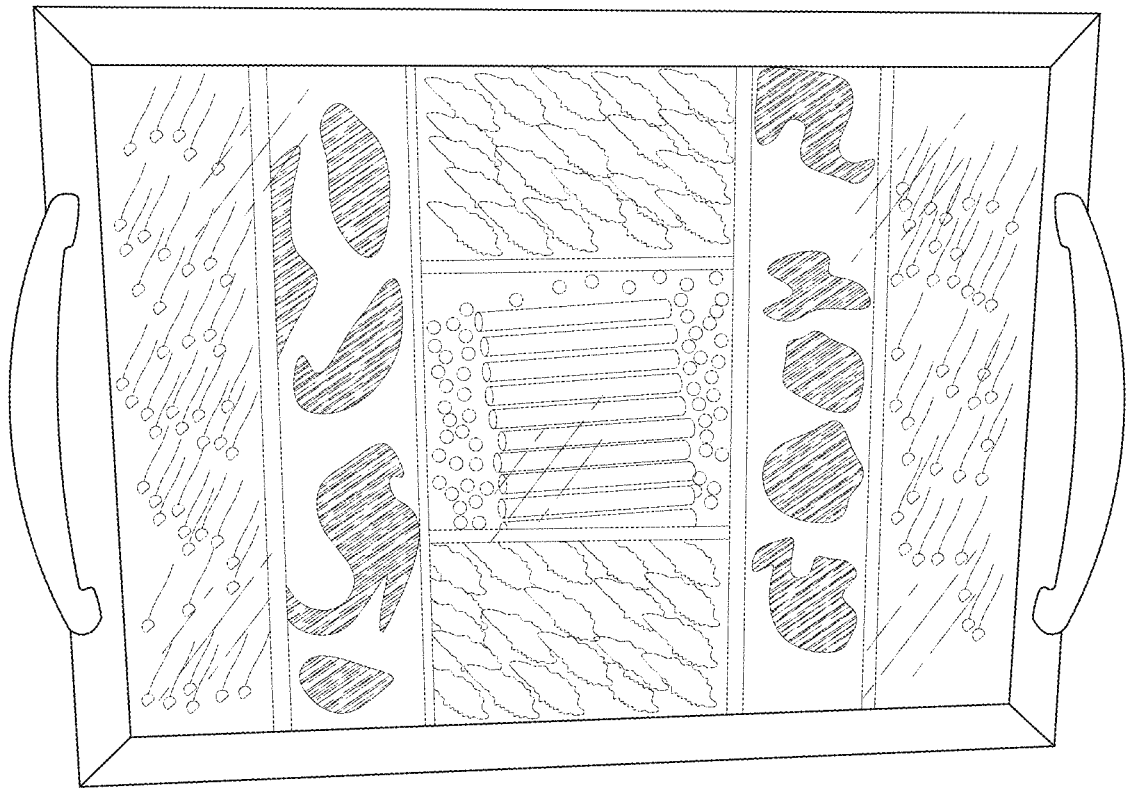
FIG. 17 is an illustration of the system incorporated into a frame with handles.
Figure 18A:
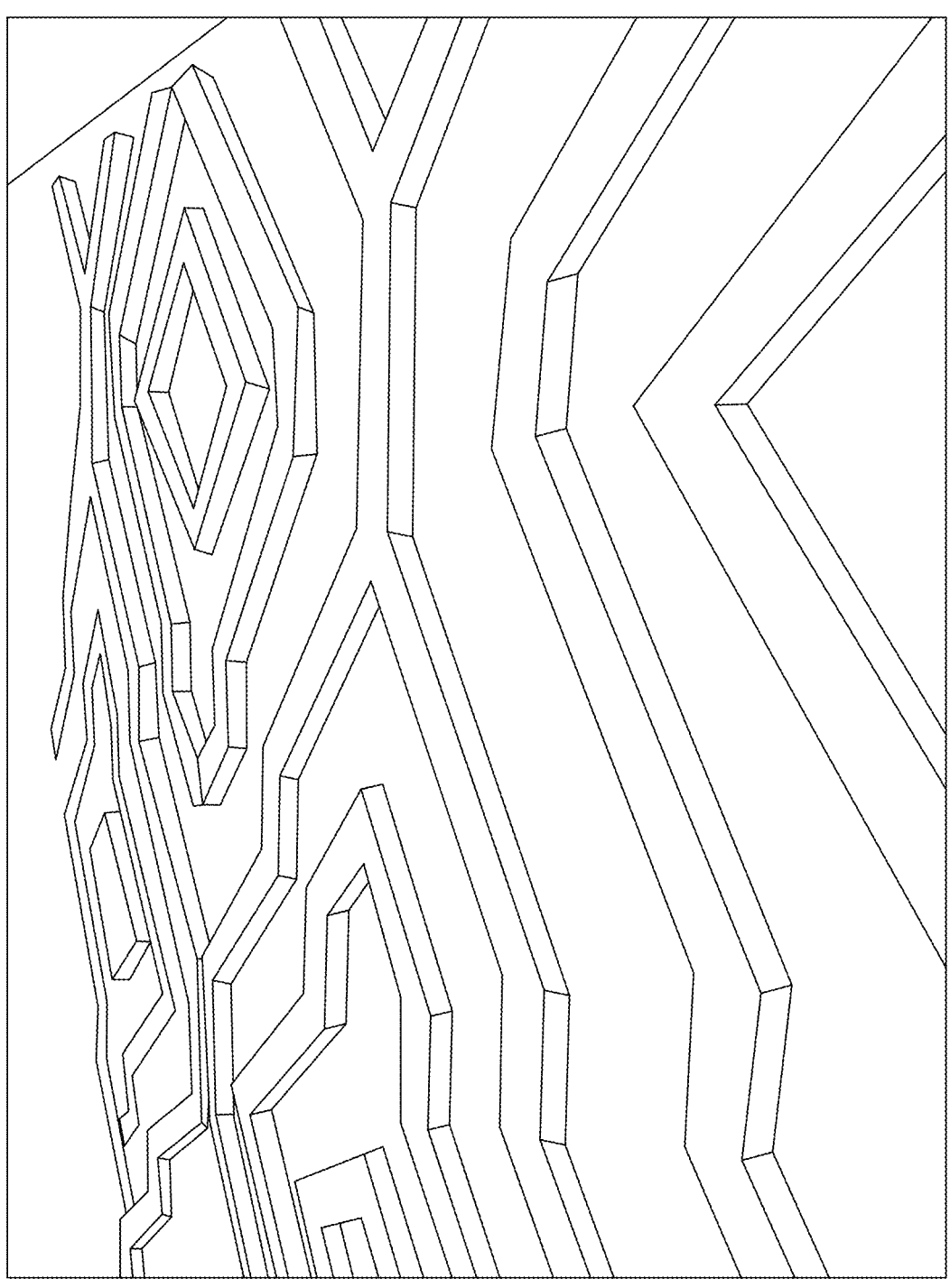
FIG. 18A and FIG. 18B show the base with a three-dimensional (3D) structure forming a pattern with filtration medium incorporated into cavities.
Figure 18B:
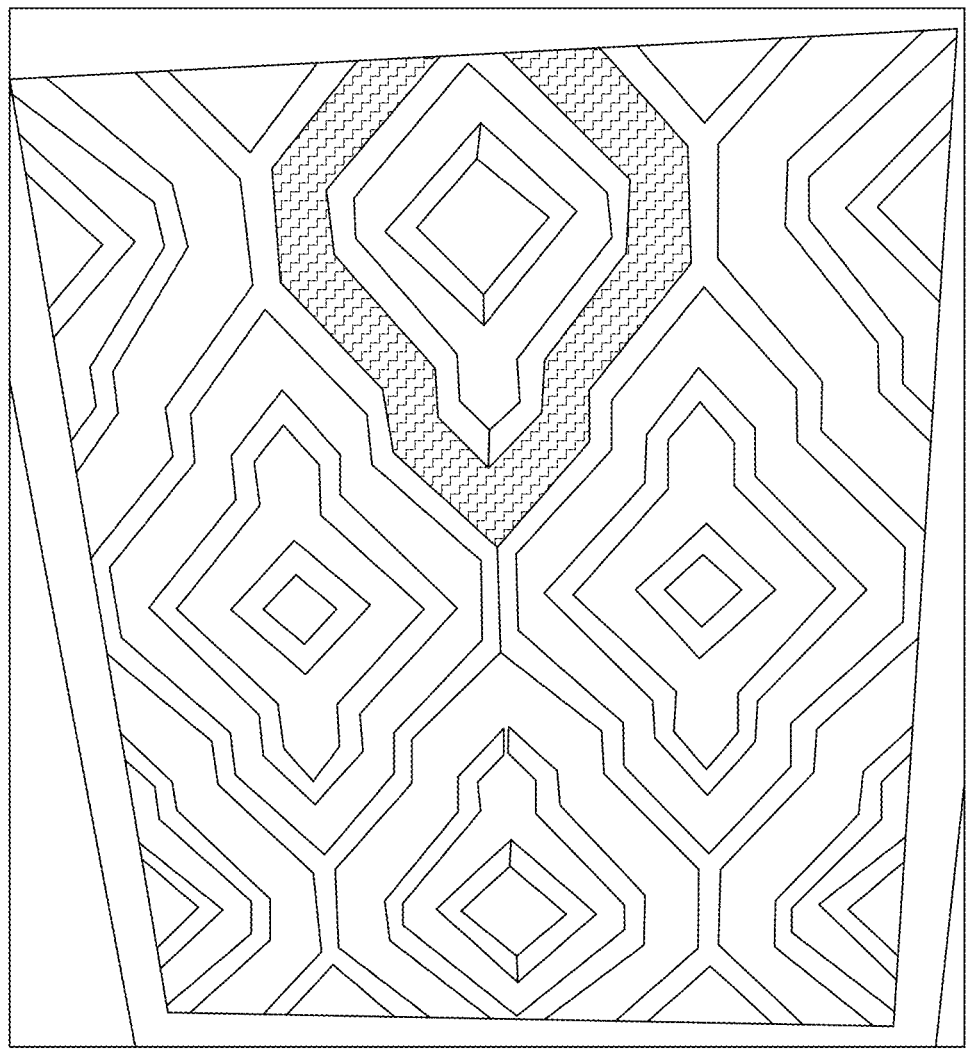
Figure 19:
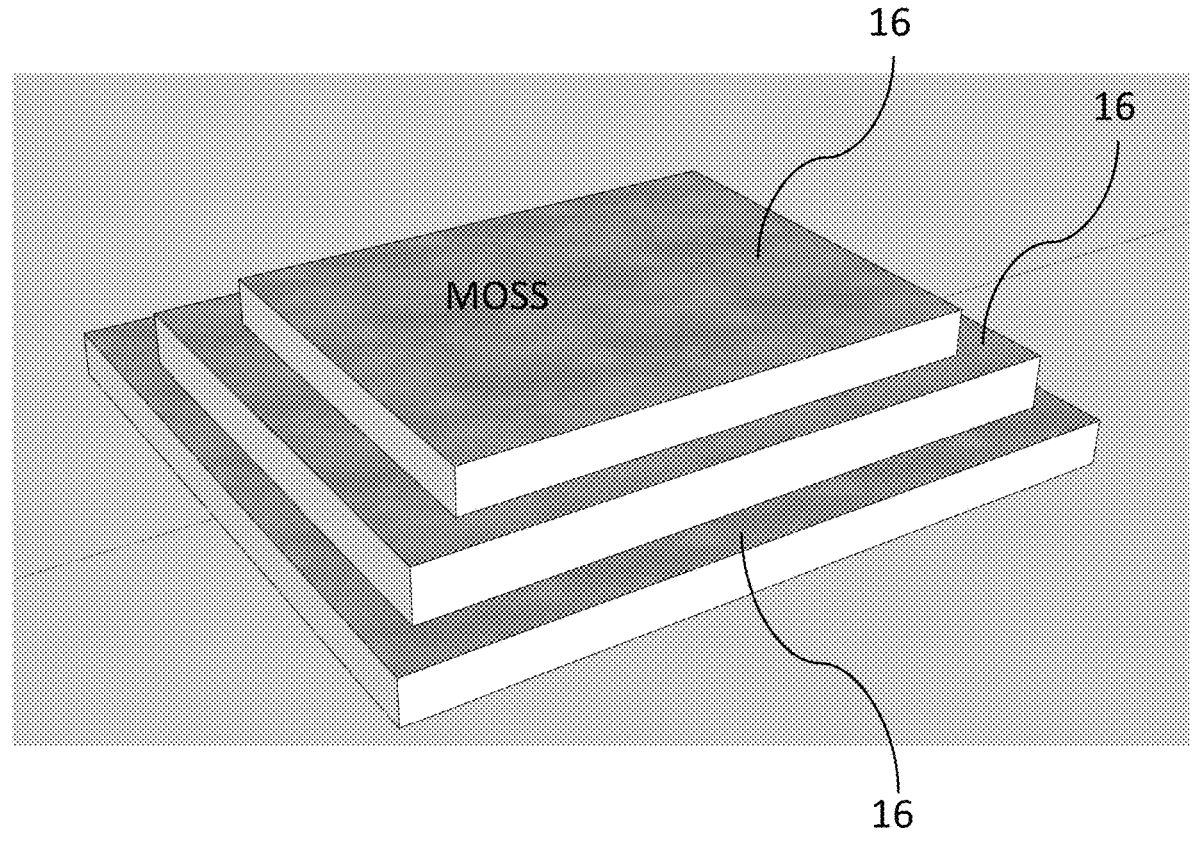
FIG. 19 show the base with filtration medium having a raised three-dimensional (3D) structure comprised of separate panels.
Figure 22A:
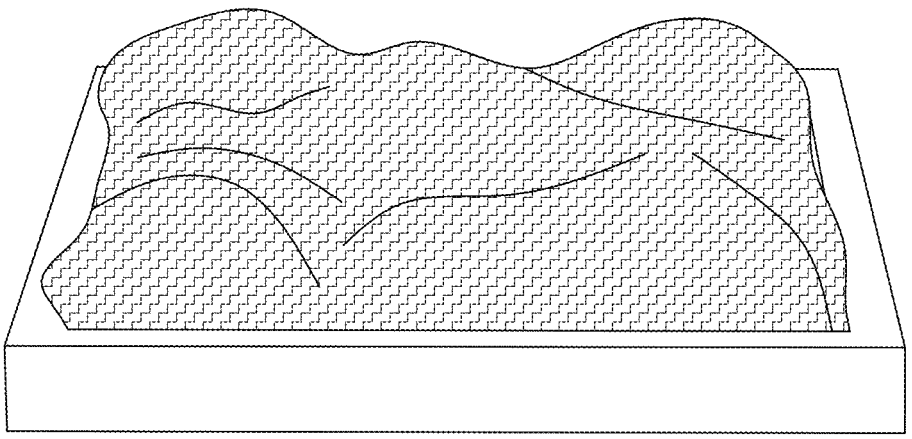
FIG. 22A and FIG. 22B show exploded view of the system incorporating dicranum moss into recessed frame.
Figure 22B:
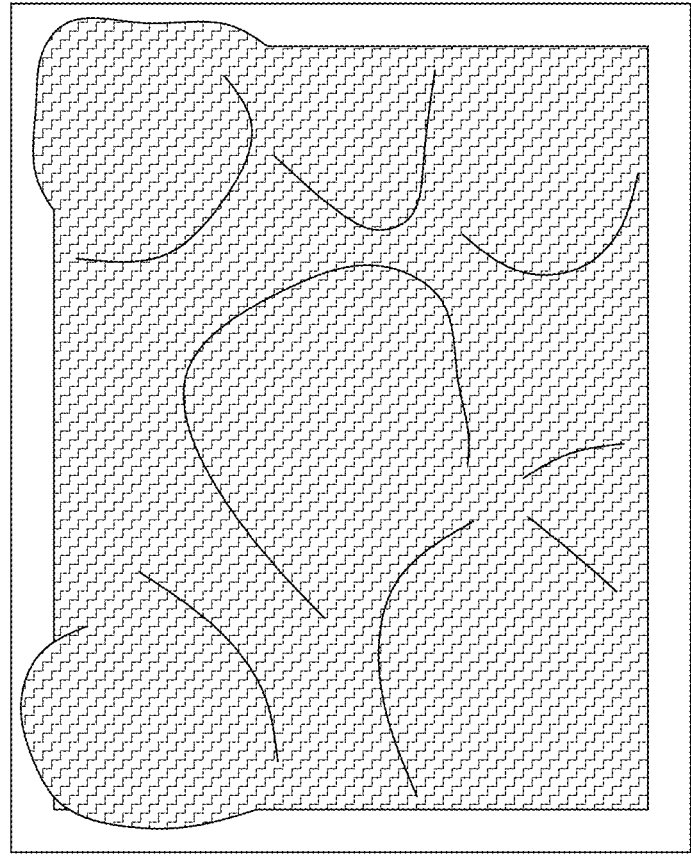
Figure 23:
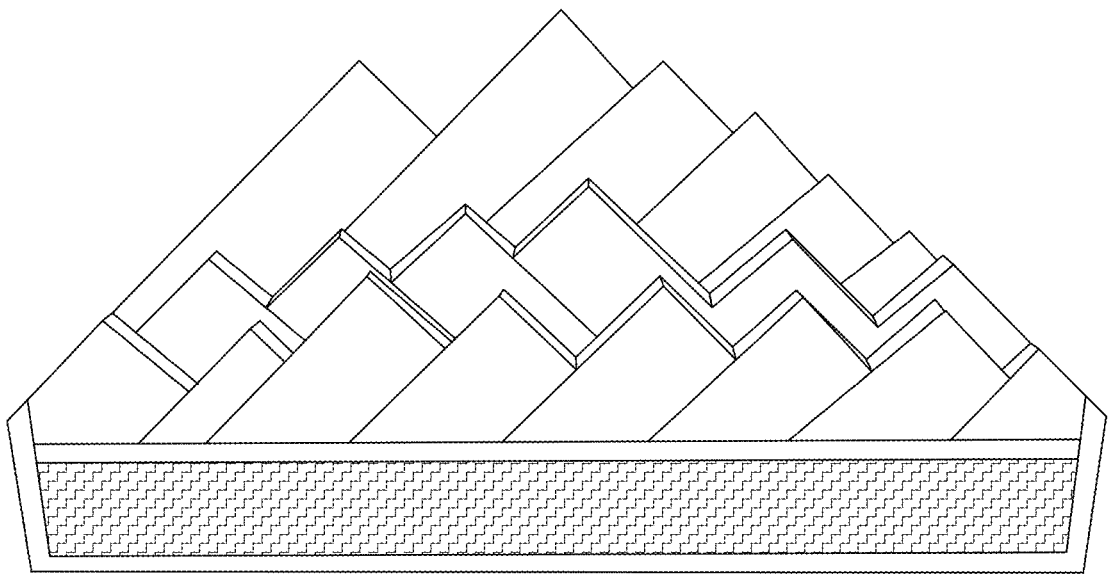
FIG. 23 show the system having a three-dimensional wood frame with LED light strips, wherein the moss and the filter are placed into the bottom recessed area.
Figure 24:
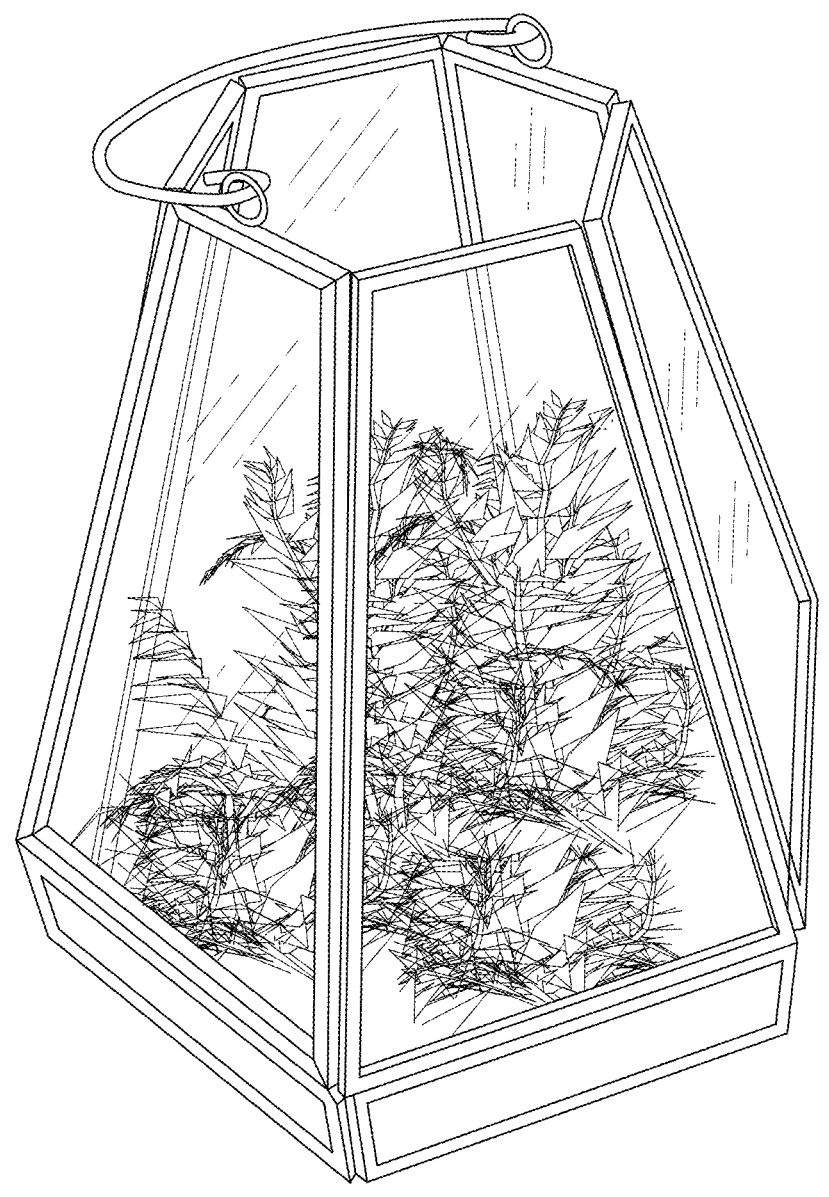
FIG. 24 show the system of the present invention wherein filtration medium is incorporated into a frame having a lantern-like configuration.

The air filtration system of the present invention can have various configurations wherein the filtration medium such as moss is arranged in one or more patterns. The base can have a raised structure with the moss arranged in a zig-zag pattern, as illustrated in FIG. 16, for example. In some instances, the moss can be incorporated into a frame having handles as illustrated in FIG. 17. According to some embodiments of the present invention the base can include a three-dimensional (3D) structure forming wavy patterns with filtration medium such as moss incorporated into cavities as shown in FIGS. 18A-18B. According to some embodiments of the present invention, the system can form a raised three-dimensional (3D) structure comprised of separate panels, as illustrated in FIG. 19. In some instances, the raised structure can be integrally formed as one piece as opposed to being built using separate panels. The air filtration medium such as moss can be incorporated into frames having various shapes. In some instances, the moss can be incorporated into a recessed rectangular frame as illustrated in FIGS. 22A-22B or into a frame having a lantern-like configuration as shown in FIG. 24, for example. In some instances, the base can be a 3-D printed structure made by virtue of 3-D printing technology, and further have compartments to house the fan, watering system, filters and other suitable components.

In the realm of stress relief and well-being, a significant opportunity was identified within the domain of biophilic design. Biophilic design, which is rooted in the inherent human inclination to connect with nature, has been empirically proven to mitigate anxiety and stress, simultaneously bolstering productivity. Traditionally, biophilic design has predominantly harnessed visual elements to forge this connection, focusing on integrating natural light, vegetation, and other elements that mimic the natural world into built environments. This approach, while beneficial, overlooks the potential of engaging other senses to enhance the therapeutic effects of biophilic principles. Hence, the system of the present invention is designed to go above and beyond biophilic design to engage other senses.

To address this limitation, the system of the present invention takes a holistic approach by incorporating multisensory experiences that cater not only to the visual but also to the tactile and olfactory senses, thereby amplifying the stress-relieving and productivity-enhancing benefits of biophilic design. The product leverages advanced 3D engineering techniques to create an immersive environment that transcends mere visual aesthetics, which goes above and beyond traditional biophilic designs to engage other senses as further explained below in more detail.

Sight: Our design strategy employs recessed and three-dimensional elements alongside the use of natural materials, such as reclaimed wood, to simulate the experience of being within a serene, modern forest. This immersive visual experience is made possible through the use of lightweight materials, as specified in our patent, which also confer the advantage of portability. Consequently, our product can be easily moved throughout various spaces, ensuring that users can enjoy a tranquil, zen-like environment wherever they choose.

Touch: Unlike conventional moss wall installations, which typically employ screens or barriers to separate the observer from the moss, the system of the present invention emphasizes direct interaction. By allowing users to physically engage with the live moss, our product not only enriches the tactile experience but also serves a therapeutic purpose. This direct interaction is facilitated by a unique binding agent that ensures the moss remains securely attached to its substrate, thereby enabling the tactile benefits without compromising the integrity of the design.

Smell: Central to the design of the present invention is the creation of a conducive environment for the moss to thrive over extended periods. This not only preserves its natural nutrients but also enables the moss to function as an effective air filter. Throughout its lifecycle, the moss emits pleasant, nature-inspired scents, releasing 'happy' pheromones that evoke the essence of the outdoors. This olfactory stimulation is designed to calm and soothe the user, further enhancing the stress-relieving properties of the product.

The holistic design approach of the system of the present invention not only emphasizes the integration of visual, tactile, and olfactory experiences but also extends to include auditory stimulation, further enriching the multi-sensory engagement offered by the product.

Hearing: To complement the visual beauty, tactile richness, and olfactory pleasure inherent in the product's design, the incorporation of an auditory component plays a pivotal role in achieving a fully immersive experience. This is realized through the integration of high-quality speakers built into the frame of the system, designed to mimic the serene and calming sounds of nature. In some instances, as described above, the speakers can also be stand-alone devices wirelessly or electrically coupled to the system of the present invention. These speakers are configured to produce a wide range of natural soundscapes, from the gentle rustling of leaves and the soothing trickle of a stream to the distant calls of wildlife. The soundscapes are curated to simulate the acoustical environment of a serene, modern forest, aligning with the visual and tactile elements of the design to create a harmonious and cohesive experience.

According to some embodiments of the present invention, the speakers are configured to allow for sound to be not just heard but felt and experienced in a manner that replicates the spatial and directional qualities of natural sounds. This auditory experience is customizable, enabling users to select soundscapes that best suit their mood or the desired ambiance, further enhancing the stress-relieving and productivity-boosting benefits of the design.

Moreover, the system's software is designed to adapt the audio output based on the time of day or specific user preferences, ensuring that the auditory experience is always in tune with the user's needs and the surrounding environment. For instance, morning soundscapes might feature bird calls to energize and uplift, while evening soundscapes could include the soothing sounds of nocturnal wildlife and a gentle brook, promoting relaxation and preparation for rest.

By integrating these auditory elements, the system transcends and goes above and beyond traditional biophilic designs and offers a holistic sensory experience that taps into the innate human connection to nature. This approach is rooted in the understanding that our environments shape our well-being, and by engaging all senses, the product offers a powerful tool for enhancing mental and physical health in the spaces where we live and work.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A system for air filtration and therapeutic relief consisting of:

a base layer;

a substrate disposed on top of the base layer, wherein the substrate is configured to store and regulate moisture;

a plant medium layer disposed directly on the substrate, wherein the plant medium layer is preserved moss, dormant moss, or;

at least one replaceable air filter layer located adjacent to the plant medium layer or to the substrate, wherein the replaceable air filter layer is at least one of:

(i) a carbon filter configured to filter volatile organic compounds; and (ii) a bacterial filter characterized by a MERV rating and configured to filter bacteria and viruses;

at least one netting layer wrapped around and enclosing the plant medium layer and the substrate to secure the plant medium layer while allowing airflow;

a UV light source disposed in the base layer or in a frame coupled to the base layer, the UV light source configured to kill bacteria; and a modular configuration enabling arrangement as standalone units or as interlocking units;

wherein the substrate is substantially devoid of metal and neither the preserved moss nor dormant moss is in direct contact with any metal.

2. A system for air filtration and therapeutic relief consisting of:

a base layer;

a substrate disposed on the base layer, the substrate configured to store and regulate moisture;

a plant medium layer disposed directly on the substrate, the plant medium layer is preserved moss, dormant moss, or both;

at least one netting layer wrapped around and enclosing the plant medium layer and the substrate to secure the plant medium layer while allowing airflow, the netting layer is a flexible mesh structure;

at least one replaceable air filter layer located adjacent to the plant medium layer or to the substrate, wherein the replaceable air filter layer is at least one of:

(i) a carbon filter configured to filter volatile organic compounds; and (ii) a bacterial filter characterized by a MERV rating and configured to filter bacteria and viruses;

at least one speaker disposed in the base layer or in a frame coupled to the base layer, the at least one speaker configured to output natural soundscapes for therapeutic relief; and a modular configuration enabling arrangement as standalone units or as interlocking units.

3. A system for air filtration and therapeutic relief consisting of:

a base layer, the base layer having a recessed frame tray having sidewalls defining a recess;

a substrate disposed in the recess, the substrate configured to store and regulate moisture;

a plant medium layer disposed directly on the substrate, wherein the plant medium layer is preserved moss, dormant moss, or both;

a first netting layer disposed between the substrate and the plant medium layer and a second netting layer disposed above the plant medium layer, the first and second netting layers securing the plant medium layer to the substrate while allowing airflow, and peripheral edge portions of the first and second netting layers being affixed to one another to form a mesh envelope that encloses the substrate and the plant medium layer;

at least two replaceable air filter layers located adjacent to the plant medium layer or to the substrate, wherein the at least two replaceable air filter layers are:

(i) a carbon filter configured to filter volatile organic compounds; and (ii) a bacterial filter characterized by a MERV rating and configured to filter bacteria and viruses;

a modular configuration enabling arrangement as standalone units or as interlocking units;

wherein components contacting the plant medium are non-metallic flexible mesh and non-metallic substrate materials.

* * * * *